United States Patent Office 3,510,418
Patented May 5, 1970

3,510,418
ION SELECTIVE MEMBRANE
Yukio Mizutani, Reiichi Yamane, Toshikatsu Sata, Tokuyama-shi, and Ryuji Izuo, Kudamatsu-shi, Japan, assignors to Tokuyama Soda Kabushiki Kaisha, Tokuyama-shi, Japan a corporation of Japan
No Drawing. Filed Feb. 20, 1967, Ser. No. 617,077
Claims priority, application Japan, Feb. 24, 1966, 41/10,759
Int. Cl. B01k 1/00, 3/10; R01d 13/02
U.S. Cl. 204—181                                12 Claims

ABSTRACT OF THE DISCLOSURE

Ion permeable membrane which can effect the permeation selectively of the ion of smaller valence from among those having the same charge, a method of its manufacture, and also a method of selectively permeating the ion of smaller valence by the use of said membrane according to ordinary electrodialysis method. The said membrane can be obtained by applying an electrolytic substance having a dissociation constant of at least 0.001 and a molecular weight of at least 100 in the dissociated state to the surface of an ordinary ion-exchange membrane in an amount of at least 0.1 mg./dm.$^2$. The method of transferring the ion of smaller valence in one electrolytic solution to another solution comprises separating by means of the membranes of this invention an electrolytic solution containing at least two species of ions of different valence but of the same charge, and passing a direct current in series through said separated solutions and membranes.

---

This invention relates to an ion permeable membrane which can selectively effect the permeation of the ion of smaller valence from among those having the same charge and to a method of producing the same. In addition, this invention relates to a method of effecting the selective permeation of ions using the foregoing ion-selective permeable membrane.

It is known heretofore to form a plurality of compartments in an electrodialysis cell by alternately disposing therein ion-selective permeable membranes, one set of which has the property of passing anions but not cations while the other set has a property contrary thereto, following which an aqueous salt solution is introduced into the compartments and then a direct current is passed in series through the separated aqueous salt solutions and the membranes to separate the foregoing aqueous solution into concentrated salt water and demineralized water. However, for example, when it is contemplated to recover sodium chloride as a concentrated solution from seawater, difficulty is encountered in taking it out alone since seawater contains various ions such as Ca$^{++}$, Mg$^{++}$, SO$_4$$^=$, CO$_3$$^=$, etc. There is also the shortcoming that the power effeciency per unit of the sodium chloride recovered is low.

In view of the foregoing shortcomings, ion permeable membranes have been proposed which contemplate to selectively dialyze only specific ions, i.e., membranes which selectively pass especially the ions of smaller valence from among those having the same charge. The selectivity of these heretofore proposed ion-selective permeable membranes is as yet not sufficiently high, and furthermore these membranes are also not fully satisfactory from the commercial standpoint. The electric resistance of these membranes are generally high, their durability is poor, and/or there is a tendency to the setting up of a neutrality disturbance phenomenon during the electrodialysis (a phenomenon wherein the electrolysis of water takes place at the surface of the ion-selective permeable membrane). In addition, the manufacturing operations are complex. Hence, there are many drawbacks, such as that the cost of production is high.

For example, the Journal of Applied Chemistry, vol. 6, p. 511 (1956) discloses an ion-selective permeable membrane of a structure in which an anion exchange membrane and a cation exchange membrane are laminated.

The foregoing membrane requires a very difficult fabrication operation in that ion exchange membranes of two different species must be laminated, and moreover the thickness of the resulting membrane inevitably becomes thick. Hence, due to its increased thickness and the fact that it is a laminate of ion exchange membranes of different species it has the drawbacks that its electric resistance is exceedingly high and moreover that it is susceptible to the incurrence of concentration polarization.

It is an object of this invention to provide an ion permeable membrane which has substantially the same electric resistance and transport number of the counter ion as those of the usual ion exchange membranes and moreover is capable of effecting the permeation selectively of the ions whose valence is small, and particularly the monovalent ion, of the ions having the same charge. Another object is to provide a method of producing the foregoing ion-selective permeable membrane, in which the production steps are exceedingly simple, thus making its cost of production very low.

Other objects and advantages of this invention will become apparent from the following description.

The foregoing objects are achieved in accordance with this invention by an ion permeable membrane which comprises principally an ion exchange membrane composed of an insoluble, infusible synthetic organic polymer having an ionic group chemically bonded thereto, the surface of which membrane having been treated with an electrolyte containing an ion component having a molecular weight of at least 100, the dissociation constant of said electrolyte being moreover at least 0.001, and the amount of said electrolyte substance being present in an amount of at least 0.1 mg. for each square decimeter of said ion exchange membrane.

The ion exchange membrane to become the substrate in this invention is known per se. This ion exchange membrane is composed of an insoluble, infusible synthetic organic polymer having an ionic group chemically bonded thereto. According to this invention, the ion exchange membrane which is preferably used as the substrate is one possessing a dissociable ionic group having a dissociation constant greater than 0.001 and in which said group is present in an amount of 0.3 milliequivalent per gram of the ion exchange membrane.

As cation exchange membranes, those having an active acidic functional group such as —SO$_3$H or —COOH group bonded to the polymer matrix are conveniently used, whereas as anion exchange membranes, those having a nitrogen-containing active basic group such as quaternary ammonium, amino group, quanidyl group, and dicyandiamidine group bonded to the polymer matrix are conveniently used.

According to this invention, it was found that by treating the surface of the aforesaid ion exchange membrane with a specific electrolytic substance an ion permeable membrane could be obtained which could effect the permeation selectively of ion of smaller valence from among those having the same charge. It was moreover found that this ion permeable membrane, after having been used continuously for a one-month period, still maintained its selectivity to specific ions effectively.

The electrolytic substance which can be used for this purpose in this invention (hereinafter referred to also as the electrolytic treating agent) are those water-soluble substances which have an ion component having a molecular weight of at least 100 and moreover whose dissociation constant is at least 0.001.

According to this invention, it is desirable that the substrate be treated with an electrolytic substance which has the same charge as the ion which can permeate the ion exchange membrane used as the substrate and contains moreover an ion component having a molecular weight of at least 100. Thus an electrolyte containing a cation whose molecular weight is at least 100 is conveniently used with the cation exchange membrane, while an electrolyte containing an anion whose molecular weight is at least 100 is suitable for treatment of an anion exchange membrane. If the molecular weight of the ion component in the electrolyte used becomes less than 100, it is not desirable since the ion component in the electrolyte permeates and migrates during use of the electrolyte.

The electrolytes capable of forming anions having a molecular weight of above 100, as used in this invention (hereinafter referred to as anion electrolytic treating agents), include:

(1) Compounds containing in their molecules either a sulfonic acid group or a sulfonate group and having a molecular weight of above 100 in their dissociated state.

(a) Aromatic compounds, such as benzene and naphthalene, which have one or more sulfonic acid groups or sulfonate groups; or the foregoing compounds in which the benzene ring has other suitable substituents such as alkyl and nitro groups.

Examples: benzene sulfonic acid and the alkali metal salts thereof, naphthalene sulfonic acid and the alkali metal salts thereof, lauryl benzene sulfonic acid and the alkali metal salts thereof.

(b) Water-soluble polymers having a plurality of sulfonic acid groups or sulfonate groups.

Examples: polystyrene sulfonic acid, polyvinyl sulfonic acid and the alkali metal salts thereof.

(2) Compounds containing a sulfate group or a sulfate salt group in their molecules and having a molecular weight of above 100 in their dissociated state.

(a) Sulfuric acid esters of alcohols.

Examples: lauryl and oleil sulfates and the alkali metal salts thereof.

(b) Water-soluble polymers having a sulfate group or sulfate salt group.

Examples: sulfuric acid esters of polyvinyl alcohol.

(3) Compounds containing a carboxyl group in their molecules and having a molecular weight of above 100 in their dissociated state.

(a) Aliphatic or aromatic compounds which are water-soluble and contain at least one carboxyl group or a group of a salt thereof.

Examples: lauryl, oleic, stearic and benzoic acids and the alkali metal salts thereof.

(b) Water-soluble polymers having a plurality of carboxyl groups or groups of the salts thereof.

Examples: polyacrylic and polymethacrylic acids and the alkali metal salts thereof.

(4) Compounds containing a phosphoric acid group in their molecules and having a molecular weight of above 100 in their dissociated state.

Examples: sodium tripolyphosphate, other polyphosphates, alkyl phosphoric acid esters and salts thereof, phosphoric acid esters of cellulose or polyvinyl alcohol.

(5) Compounds containing a phenolic hydroxyl group in their molecules and having a molecular weight of above 100 in their dissociated state.

Examples: lauryl phenol.

(6) Compounds containing a boric acid or arsenic acid group in their molecule and having a molecular weight of above 100 in their dissociated state.

Examples:

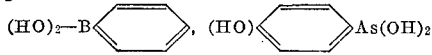

On the other hand, the electrolytes capable of forming cations and having a molecular weight of above 100, as used in this invention (hereinafter referred to as cation electrolytic treating agents) include:

(7) Compounds containing either a primary, secondary or tertiary amino group in their molecules and having a molecular weight of above 100 in the dissociated state.

(a) Aliphatic, aromatic and heterocyclic compounds having at least one amino group, and particularly the cationic surfactants.

Examples: long-chain amines having alkyl groups of 12 to 18 carbon atoms such as lauryl amine, triethanolamine monostearate, stearamide ethyl diethylamine, 2-heptadecinyl hydroxyethyl imidazole.

(b) Water-soluble polymers having a plurality of either amino or imino groups in their molecules.

Examples: polyvinyl imidazole, polyethylene imine, polyvinyl pyridine.

(8) Quaternary ammonium salts having a molecular weight of above 100 in their dissociated state.

Examples: lauryl trimethyl ammonium chloride, cetyl pyridium chloride, stearamide methyl pyridium chloride, polyvinyl pyridinium chloride.

(9) Quaternary phosphonium salts having a molecular weight of above 100 in their dissociated state.

Example:

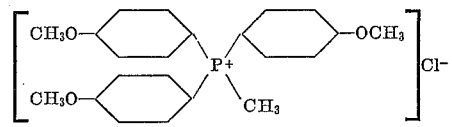

(10) Tertiary sulfonium salts having a molecular weight of above 100 in their dissociated state.

Example:

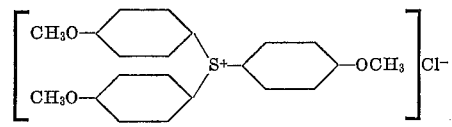

(11) The charged tetra- or hexacoordinated complexes of transition metals having a molecular weight of above 100 in their dissociated state.

For example, those having the metal such as Mg, Ca, Co, Ni and Fe and as the ligand $NH_3$, $NH_2CH_2 \cdot CH_2NH_2$, triethylene tetramine, tetraethylene pentamine and amino acids.

$(NaOOCCH_2)_2NC_2H_4N$, $(CH_2COONa)_2$-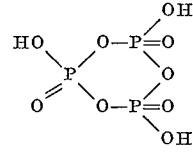

and $$\begin{array}{c} HO \\ \diagdown \\ O=P \\ \diagup \\ O \end{array} \begin{array}{c} O-P=O \\ \diagup \quad \diagdown \\ \diagdown \quad O \\ O-P=O \end{array} \begin{array}{c} OH \\ \diagup \\ \diagdown \\ OH \end{array}$$

Examples:

$[CO(NH_3)_6]Cl_3$, $[CO(NH_2CH_2NH_2)_3]Cl_3$,
$[CO(NH_3)NO_2]Cl_2$, $[CO(NH_2CH_2CH_2NH_2)_2(NSC)_2]Cl$,
$[Cr(CN)_6]K_3$, $[Cr(NH_3)_2CNCS)_4NH_4$,
$[Co(NH_3)_2(NO_2)_4]NH_4$.

Further, it is also possible to use as the aforesaid electrolytic substances in this invention the water-soluble amphoteric compounds which possess conjointly a cationic functional group and an anionic functional group and whose molecular weight is above 100 in their dissociated state; for example these compounds include octadecyl betain, alkyl-aminoethyl glysine, 1-hydroxyethyl-1-carboxymethyl-2-undecyl imidozoline, and adenosine triphosphate.

According to this invention, the hereinbefore described electrolytic treating agent is applied to the surface of the ion exchange membrane in an amount of at least 0.1 mg., and preferably 0.5 mg., per square decimeter of the surface. The desired selectivity effect cannot be expected with an amount less than that indicated above. On the other hand, even though the electrolytic treating agent is applied to the surface in an excessively great amount there is a limit to the improvement in the selectivity to be had and moreover since it is economically a disadvantage, the amount applied of the electrolytic treating agent to the ion exchange membrane substrate is desirably 0.5–5 mg. per square decimeter of the membrane surface.

The application of the electrolytic treating agent to the ion exchange membrane substrate is readily accomplished by dipping the ion exchange membrane in a solution of the electrolytic treating agent. The concentration of the electrolytic treating agent in the solution at this time should preferably be at least 0.1 p.p.m., and particularly at least 0.5 p.p.m. The conditions under which the dipping is carried out will vary considerably depending upon the species of the ion exchange membrane used, the species of the electrolytic treating agent and the concentration thereof in the solution, but the dipping time is experimentally determined so that the application of the electrolytic treating agent to the ion exchange membrane substrate amounts to at least 0.1 mg. per square decimeter of the membrane surface.

Alternatively, the electrolytic treating agent can be applied to the ion exchange membrane substrate by a procedure consisting of introducing the membrane substrate into an electrolytic cell containing an aqueous solution of the electrolytic treating agent and disposing the substrate between the cathode and anode, followed by passage of a direct current between the electrodes, thereby effecting the application of the electrolytic treating agent to the ion exchange membrane substrate by means of electrophoresis. In this case, the aqueous solution of the electrolytic treating agent used must be of a concentration not less than 0.1 p.p.m.

Further, it goes without saying that the application of the electrolytic treating agent to the ion exchange membrane substrate can be done by a coating operation, as with a brush or the like.

The ion exchange membrane substrate can have only one or both of its surfaces treated with the electrolytic treating agent. In this case, it is, of course, possible to apply an anionic electrolytic treating agent to one of its surfaces while applying a cationic electrolytic treating agent to its other surface. Thus, still better selectivity can be imparted to the ion permeable membrane of this invention.

The reason why the property that the ions of smaller valence of those having the same charge are selectively permeated is set up in the ion permeable membrane of this invention by the application of a very minute amount of the electrolytic treating agent to an ion exchange membrane substrate and the reason why the selectivity is effectively maintained even after using the membrane continuously for a one-month period are not yet clarified. According to our studies, however, the electrolytic treating agent is, in its dissociated state, of such size according to this invention that it does not pass through the minute holes of the ion exchange membrane substrate, with the consequence that it is believed that it is applied to the ion exchange membrane substrate as a very thin layer. Further, it is also presumed that the macro ions which result from the dissociation of the electrolytic treating agent are pulled inwardly of the substrate by the electric field and hence are not readily dissociated from the surface of the substrate. In addition, it is also conceivable that the macro ion component having a charge opposite to that of the ionic group of the ion exchange membrane substrate is bonded electrostatically to the substrate surface.

The features of the membrane of the invention which possesses selective permeability with respect to only the ions of small valence of those of the same species resides in the fact that it has less electric resistance than the membranes of this sort that were known heretofore, that its transport number of the counter ion is high, and that its manufacturing procedure is simple. The ion-selective permeable membrane of this invention usually has an electric resistance which is practically the same as that of the ion exchange membrane substrate.

Further, the cationic ion-selective permeable membrane of this invention demonstrates higher selectivity in its permeability of the monovalent ions such as the hydrogen ion and the alkali metal ions as compared with its permeability of the di- or trivalent ions such as the alkaline earth metal ions, aluminum ion and the divalent ions of the metals of Group VIII, or ions of still higher valence. Similarly, the anionic ion-selective permeable membrane demonstrates higher selectivity in its ion permeability of the monovalent anions such as the hydroxyl and halogen ions as compared with its permeability of the di- and trivalent ions such as the sulfuric acid, carbonic acid, boric acid and phosphoric acid ions, or ions of still higher valence.

In consequence, the membrane of this invention can be conveniently used in the electrodialysis field in which were hitherto used the conventional ion-selective permeable member. Namely, an electrolytic solution containing at least two species of ions having the same charge but of different valence can be separated by the ion-selective permeable membrane of this invention, and then by passing a direct current in series through the separated solutions and the membranes an ion of a certain electric charge and of a smaller valence of one of the electrolytic solutions can be selectively transferred to the other solution excluding substantially the ions of the same charge but of higher valence and the ions having the opposite charge.

In this case, if concentrating compartments and diluting compartments are constituted alternately in accordance with the known technique by disposing in alternation the anion- and cation-selective permeable membranes of this invention and then a direct current is passed in series between the two electrodes, a concentrated electrolytic solution containing a specific ion can be taken out from the concentrating compartments while a dilute electrolytic solution from which the specific ion has been eliminated can be taken out from the diluting compartments.

From the standpoint of maintaining the permselectivity of ion permeable membrane of the invention which can selectively effect the permeation of the ions of smaller valence from among those having the same charge, it is preferred that in using this membrane in electrodialysis that it be positioned so that its surface which was treated with the electrolytic treating agent is at the anode side in those cases where the macro ion in the treating agent was cationic, whereas it be positioned so that its treated surface is at the cathode side in those cases where the macro ion in the treating agent was anionic.

According to this invention, the ion-selective permeable membrane of this invention can be formed in situ when carrying out the electrodialysis. Namely, in carrying out the electrodialysis by introducing an electrolytic solution into an electrodialysis cell made up by disposing the conventional cation and anion exchange membranes alternately and passing a direct current therethrough in series, by either adding the electrolytic treating agent of this invention to the electrolytic solution in advance, or continuously or intermittently during the electrodialysis, the foregoing ion exchange membranes can be converted in situ to the selective permeable membranes of this invention which can selectively effect the permeation of ion of smaller valence from among those having the same charge. At this time, if the anionic and/or cationic electrolytic treating agent is added to the electrolytic solution to be introduced to the diluting compartment, there is the merit that the formation of the ion-selective permeable membrane of this invention is accomplished promptly as well as efficiently.

There are occasions when the selectivity declines after a period of prolonged use. In such a case, the selectivity can be restored in situ by the addition of the electrolytic treating agent to the electrolytic solution during operation of the electrodialysis as hereinbefore described. Needless to say, the ion-selective permeable membrane of this invention whose selectivity has declined can also be regenerated either by dipping the same in a solution of the electrolytic treating agent or by application of the treating agent solution with a brush.

For a further understanding of this invention the following examples will be given.

In the examples the permselectivity between the ion of smaller valence $M_1$ and the ion of greater valence $M_2$ having the same charge has been indicated by the relative transport number $$P_{M_1}^{M_2}$$

$$P_{M_1}^{M_2} = (t_{M_2}/t_{M_1}) \text{ intramembrane}/(C_{M_2}/C_{M_1}) \text{ intrasolution} \quad (1)$$

wherein $t_{M_1}$ and $t_{M_2}$ are the transport numbers of ions $M_1$ and $M_2$, respectively, and $C_{M_1}$ and $C_{M_2}$ are the concentrations of ions $M_1$ and $M_2$, respectively.

The electrodialysis apparatus employed was that of two compartments separated by either an anion- or a cation-selective membrane. A prescribed quantity of the solution of known concentration was introduced into the two compartments, following which an electric current was passed between silver chloride electrodes. The intramembrane cation transport numbers were computed from the changes that occur in the amount of ions in each compartment before and after passage of the electric current, and then the relative transport number was obtained by substitution of these values in Equation 1. The measurement was made at a temperature of 25° C., and both compartments were vigorously stirred.

Separately, a multicompartment type of electrodialysis apparatus constituted by disposing a plurality of pairs of anion- and cation-selective permeable membranes was used, into each of which compartments was introduced seawater of the following composition at the rate of 6 cm./sec. A current was then passed through the apparatus via of electrodes provided at both ends thereof at a current density of 2 amp./dm.² of the membrane area. The effective area of the membrane was 1 dm.² and the temperature of the seawater was 30° C.

Composition Equivalent/liter: Cl, 0.53; SO₄, 0.05; Ca, 0.02; Mg, 0.11; K, 0.01; Na, 0.44.

The solutions concentrated by electrodialysis separately in the alternate compartments were analyzed after their compositions reached equilibrium, and the relative transport number was obtained using the approximate Equation 2.

$$P_{M_1}^{M_2} = (C_{M_2}/C_{M_1}) \text{ conc. solution}/(C_{M_2}/C_{M_1}) \text{ seawater} \quad (2)$$

EXAMPLE 1

(A) One part of finely divided powder of polyvinyl chloride, 0.90 part of styrene, 0.10 part of 50% divinyl benzene, 0.3 part of dioctyl phthalate and 0.01 part of benzoyl peroxide were homogeneously mixed, and the resulting mixture was applied to a 1.6 mesh polyethylene net. The so treated net was covered with cellophane on both surfaces, and polymerised by heating for 3 hours at a temperature of 110° C. The obtained film was sulphonated for 24 hours with a 98% sulphuric acid of 50° C. thereby to give a cationic exchange membrane having a sulphonic acid group as an exchange group. With the use of this cationic exchange membrane, an electrolytic solution of a mixture of 0.2 N NaCl and 0.2 N CaCl₂ was subjected to electrodialysis. The cationic transport number, direct electric resistance, and relative transport number $$\left(P_{N_a}^{C_a}\right)$$

as measured by the two-compartment electrodialysis method, were 0.98, 7Ω cm.², and 2.5, respectively.

(B) In carrying out the above-mentioned electrodialysis, poly-2-vinylpyridine hydrochloride with a molecular weight of 30,000 was added to an electrolytic solution in the anodic compartment to a concentration of 20 p.p.m. It was found that the cationic transport number, direct current resistance and relative transport number $$\left(P_{N_a}^{C_a}\right)$$

are 0.98, 10Ω cm.² and 0.4. The presence of about 1 mg./dm.² of poly-2-vinylpyridine hydrochloride on the surface of the said membrane was observed.

Subsequently, the electrolytic solution containing poly-2-vinylpyridine hydrochloride was discharged from the dialysis vessel. The same electrolytic solution as abovementioned containing no poly-2-vinylpyridine hydrochloride was added thereto, and the same experiment as abovementioned was carried out. The results were the same. The presence of 0.8 mg./dm.² of poly-2-vinylpyridine hydrochloride on the surface of this membrane was observed.

(C) Instead of the polyvinyl pyridine, lauryl pyridinium chloride was added to the anodic compartment to a concentration of 300 p.p.m. It was found that the cation transport number, direct current resistance and relative transport number $$\left(P_{N_a}^{C_a}\right)$$

are 0.95, 11Ω cm.² and 1.2 respectively.

EXAMPLE 2

A polymeric latex consisting of 30 parts of styrene and 70 parts of butadiene was applied to a glass fabric. A membranous substance obtained after drying was sulphonated for 5 hours with a 95% sulphuric acid of 30° C. to thereby give a cationic exchange membrane having a sulphonic acid group as an exchange group. With the use of this cationic membrane, an electrolytic solution of a mixture of 0.4 N KCl and 0.1 N MgCl₂ was subjected to electrodialysis. The cation transport number, direct current resistance and relative transport number $$\left(P_{K}^{M_g}\right)$$

as measured by the two-compartment electrodialysis method, were 0.99, 6Ω cm.², and 0.9, respectively.

In the above-mentioned dialysis, a polymeric substance obtained by treating poly-2-vinylpyridine with methyl iodide to thereby convert about ½ of the pyridyl group to a methyl pyridinium group was added to the electrolytic solution on both sides of the membrane to a concentration of 5 p.p.m. As a result, the cation transport number, direct current resistance and relative transport number $$\left(P_{K}^{M_g}\right)$$

were 0.98, 7Ω cm.², and 0.3, respectively.

The presence of about 0.4 mg./dm.² of poly-2-vinylpyridine hydrochloride on the surface of the said membrane was observed.

When instead of the methyl iodide-treated poly-2-vinylpyridine, polyacrylic acid with a molecular weight of 3,000 was added to both sides of the membrane to a concentration of 300 p.p.m., the cation transport number, direct current resistance and relative transport number $$\left(P_{K}^{M_g}\right)$$

were 0.99, 7Ω cm.² and 0.8, respectively.

Subsequently, a polymeric substance obtained by treating poly-2-vinylpyridine with methyl iodide to thereby converting about ½ of the pyridyl group into a methyl pyridinium group was added to the anodic side to a concentration of 5 p.p.m., and polyacrylic acid with a molecular weight of 500 was added to the cathodic side to a concentration of 300 p.p.m. It was found that the cation transport number, direct current resistance and relative transport number $$\left(P_K^{M_g}\right)$$

are 0.99, 7Ω cm.² and 0.2, respectively.

EXAMPLE 3

Finely divided powder of polyvinyl chloride (1.0 part), 1.5 parts of 4-vinylpyridine, 0.1 part of 50% divinylbenzene, 0.3 part of dioctyl phthalate and 0.02 part of benzoyl peroxide were homogeneously mixed to form a paste. The resulting paste was applied to a fabric of polyvinyl chloride. The so treated fabric was covered with cellophane and polymerised by heating for 3 hours at 90° C. The obtained film was immersed for 24 hours at 25° C. in a solution composed of 2 parts of methyl iodide and 8 parts of methanol, and then thoroughly washed with hydrochloric acid. There was obtained an anionic exchange membrane having a pyridinium group as an exchange group.

With the use of a multi-compartment electrodialysis apparatus in which the said anionic exchange membrane and the cationic exchange membrane of Example 1(A) were provided, an experiment was conducted on the concentrating of sea brine. First, electrodialysis was performed for 3 days by introducing a sea brine to which had been added polyethylene imine with a molecular weight of 30,000 to a concentration of 10 p.p.m. Subsequently, a sea brine to which the said compound was not added was introduced, and the electrodialysis was continued. The results obtained are shown in Table 1 in comparison with the results obtained by subjecting sea brine to dialysis with the use of a membrane which was not treated with polyethylene imine.

TABLE 1

| Period after start of experiment | Before treatment | 2 | 5 | 7 | 10 | 15 | 20 | 30 |
|---|---|---|---|---|---|---|---|---|
| Sea brine to be treated | Sea brine per se | Sea brine containing polyethylene imine | Sea brine per se | | | | | |
| Electric current effect of entire ions | 0.91 | 0.91 | 0.92 | 0.91 | 0.90 | 0.92 | 0.91 | 0.91 |
| $P_{N_a}^{C_a}$ | 1.6 | 0.6 | 0.6 | 0.6 | 0.5 | 0.6 | 0.7 | 0.8 |
| $P_{N_a}^{M_g}$ | 1.0 | 0.4 | 0.3 | 0.3 | 0.3 | 0.3 | 0.5 | 0.6 |

It was observed that 0.6 mg./dm.² of polyethylene imine was deposited on the surface of the membrane so treated. It is clear from this example that selective permeation of Na ions is markedly improved by treating a cationic exchange membrane with polyethylene imine, and that the ionic exchange membrane of this invention has a prolonged selectivity.

EXAMPLE 4

The cationic exchange membrane of Example 1(A) was immersed for 4 hours at room temperature in a 2% aqueous solution of polyethylene imine with a molecular weight of 30,000, withdrawn and thoroughly washed with water. The deposition of 5 mg./dm.² of polyethylene imine on the surface of the membrane was observed. With the use of this membrane, an electrolytic solution of a mixture of 0.2 N NaCl and 0.2 N CaCl₂ was subjected to electrodialysis. The cation transport number, direct current resistance, and relative transport number $$\left(P_{N_a}^{C_a}\right)$$

as measured by the two-compartment electrodialysis method, were 0.98, 11Ω cm.² and 0.5, respectively.

EXAMPLE 5

(A) With the use of the cationic exchange membrane of Example 1, an electrolytic solution of a mixture of 0.2 N HCl and 0.2 N FeCl₃ was subjected to a two-compartment electrodialysis. The relative transport number $$\left(P_H^{Fe}\right)$$

measured was 0.5.

(B) In the electrodialysis of the said (A), polyethylene imine with a molecular weight of 6,000 was added to the anodic compartment to a concentration of 500 p.p.m. As a result, the relative transport number $$\left(P_H^{Fe}\right)$$

was 0.05.

EXAMPLE 6

(A) A polyvinyl chloride film with a thickness of 0.15 mm. was immersed for 8 hours at 25° C. in a solution consisting of 90 parts of styrene, 10 parts of divinylbenzene, 20 parts of dioctyl phthalate, 25 parts of petroleum ether and 2 parts of benzoyl peroxide, and withdrawn. The so treated film was covered on the surface with cellophane, and heated for 5 hours at 100° C. thereby to give a membranous polymeric substance. This membranous polymeric substance was chloromethylated for 8 hours at 25° C. with a solution consisting of chloromethyl, 25 parts of methyl ether, 75 parts of carbon tetrachloride and 5 parts of anhydrous stannic chloride, washed thoroughly with methanol, and aminated with a 30% aqueous solution of trimethyl amine, whereby an anionic exchange membrane having a trimethylbenzyl ammonium group as an exchange group was obtained.

With the use of this anionic exchange membrane, an electrolytic solution of a mixture of 0.25 N NaCl and 0.25 N Na₂SO₄ was subjected to a two-compartment electrodialysis. The anion transport number, direct current resistance and relative transport number.

$$\left(P_{Cl}^{SO_4}\right)$$

as measured were 0.99, 7Ω cm², and 0.17, respectively.

(B) In the said electrodialysis of (A), a low condensation product of naphthalenesulphonic acid and formalin (trademark Demor N) was added to the cathodic compartment to a concentration of 1,000 p.p.m. As a result, the anion, transport number, direct current resistance and relative transport number $$\left(P_{Cl}^{SO_4}\right)$$

were 0.98, 7Ω cm.², and 0.07, respectively. When the said treating agent was added to a concentration of 1,000 p.p.m., the anion transport number, direct current resistance and relative transport number $$\left(P_{Cl}^{SO_4}\right)$$

were found to be 0.98, 9Ω cm.² and 0.04, respectively.

The deposition of 4 mg./dm.² of the low condensation product of naphthalenesulphonic acid and formalin on the surface of the said membrane was observed.

EXAMPLE 7

When poly(sodium styrenesulphonate) obtained by sulphonating polystyrene with a molecular weight of 10,000 with a 98% sulphuric acid for 24 hours at 90° C. and neutralising it with caustic soda was added in Example 6(A), it was found that the anionic transport number, direct current resistance and relative transport number were 0.99, 7Ω cm.² and 0.13, respectively.

The deposition of 4 mg./dm.² of polystyrene sulphonate on the surface of the said membrane was observed.

EXAMPLE 8

A paste consisting of 100 parts of finely divided powder of polyvinyl chloride, 160 parts of 4-vinylpyridine, 10 parts of styrene, 10 parts of divinylbenzene, 25 parts of dioctyl phthalate and 3 parts of benzoyl peroxide was applied to a fabric of polyvinyl chloride. The so treated fabric was covered on both surfaces with cellophane and heated for 5 hours at 90° C. to thereby give a membraneous polymeric substance.

This membraneous polymeric substance was quaternarised by treating it for 20 hours at 25° C. with a solution consisting of 50 parts of methanol and 50 parts of methyl iodide whereby an anionic exchange membrane having an N methyl-pyridium group as an exchange group was obtained.

Under the same conditions as employed in Example 6, a two-compartment electrodialysis was carried out. The anion transport number direct current resistance and relative transport number were 0.99, 3Ω cm.² and 0.16, respectively.

When in the above electrodialysis, poly(sodium acrylate) was added to the cathodic and anodic compartments to a concentration of 100 p.p.m., the anion transport number, direct current resistance, and relative transport number were 0.99, 3Ω cm.², and 0.13, respectively.

The deposition of 4 mg./dm.² of the polyacrylate on the surface of said membrane was observed.

EXAMPLE 9

When a two-compartment electrodialysis was carried out under the same conditions as described in Example 6 with the use of the same membrane as used in Example 8, each of the additives indicated in Table 2 below was added to the cathodic compartment to the concentration indicated in the same table. As a result, the anion transport number, direct current resistance and relative transport number shown in the same table were obtained.

TABLE 2

| Additive | Amount added (p.p.m.) | Anion transport number | Direct current resistance (Ω cm.²) | Relative transport number |
| --- | --- | --- | --- | --- |
| Low condensation product of naphthalene-sulphonic acid with formalin | 500 | 0.99 | 3 | 0.08 |
| Sodium p-phenol sulphonate | 100 | 0.99 | 3 | 0.12 |
| Oleyl sulphate | 100 | 0.92 | 5 | 0.11 |
| Poly(sodium vinyl-sulphonate) | 1,000 | 0.99 | 3 | 0.12 |

EXAMPLE 10

When a two-compartment electrodialysis was carried out under the same conditions as described in Example 6 with the use of the same membrane as used in Example 8, meta-phenylene diamine hydrochloride was added to the anodic and cathodic compartments to a concentration of 50 p.p.m. As the result, the anion transport number, direct current resistance and relative transport number were 0.99, 3Ω cm.² and 0.10, respectively.

The deposition of 1 mg./dm.² of meta-phenylene diamine hydrochloride on the surface of the said membrane was observed.

EXAMPLE 11

When a two-compartment electrodialysis was carried out under the same conditions as described in Example 6 with the use of the membrane as used in Example 8, each of the additives indicated in Table 3 below was added to the anodic compartment to the concentration indicated in the same table. As a result, the anion transport number, direct current resistance and relative transport number shown in the same table were obtained.

TABLE 3

| Additive | Amount added (p.p.m.) | Anion transport number | Direct current resistance (Ω cm.²) | Relative transport number |
| --- | --- | --- | --- | --- |
| Polyethylene imine | 1,000 | 0.99 | 3 | 0.07 |
| Meta-toluidine hydro chloride | 50 | 0.99 | 3 | 0.12 |
| Poly-2-vinylpyridine hydro-chloride | 500 | 0.99 | 3 | 0.12 |

EXAMPLE 12

The same membrane as used in Example 8 was immersed for 3 hours in a 5% aqueous solution of a low condensation product of Formalin and naphthalenesulphonic acid (Demor N), withdrawn, and thoroughly washed with water, and then a two-compartment electrodialysis was carried out in the same manner as in Example 6. As the result, the anion transport number, direct current resistance, and relative transport number were 0.98, 3Ω cm.² and 0.08, respectively.

The deposition of 7 mg./dm.² of a low condensation product of the naphthalenesulphonic acid and formalin on the surface of the said membrane was observed.

EXAMPLE 13

The same membrane as used in Example 8 was immersed for 1 hour at room temperature in a 5% aqueous solution of meta-phenylenediamine hydrochloride, withdrawn, and wiped on the surface with a filter paper. Thereafter, a two-compartment electrodialysis was carried out according to the method described in Example 6. The anion transport number, direct current resistance and relative transport number obtained were 0.99, 3Ω cm.², and 0.09, respectively.

The deposition of 4 mg./dm.² of meta-phenylene diamine hydrochloride on the surface of the said membrane was observed.

EXAMPLE 14

To one side of the same membrane as that of Example 8 was applied three times a 20% aqueous solution of meta-phenylene diamine hydrochloride, and a 5% aqueous solution of a low condensation product of Formalin and naphthalenesulphonic acid (trade name being Demor N) was applied three times on the opposite side. After drying for two hours at room temperature, a two-compartment electrodialysis was carried out in the same manner as in Example 6 with the side on which meta-phenylene diamine hydrochloride had been applied being used as the anodic side. The anion transport number, direct current resistance and relative transport number were 0.97, 5Ω cm.² and 0.06, respectively.

The deposition of 4 mg./dm.² of meta-phenylene diamine hydrochloride on one surface of the membrane and 1 mg./dm.² of the low condensation product of naphthalenesulphonic acid and Formalin on the other was observed.

EXAMPLE 15

When a two-compartment electrodialysis was carried out in the same manner as described in Example 6 with the use of the same membrane as used in Example 6, polyethylene imine with a molecular weight of 30,000 was added to the cathodic compartment to a concentration of 500 p.p.m. and sodium p-phenolsulphonate was also added to the anodic compartment to a concentration of 100 p.p.m. The anion transport number, direct current resistance and relative transport number were 0.98, 8Ω cm.$^2$, and 0.05, respectively.

The deposition of 5 mg./dm.$^2$ of polyethylene imine on one surface of the membrane and 1 mg./dm.$^2$ of p-phenolsulphonate on the other was observed.

EXAMPLE 16

A paste composed of 100 parts of finely divided powder of polyvinyl chloride, 220 parts of styrene, 20 parts of divinylbenzene, 20 parts of dioctyl phthalate and 2 parts of benzoyl peroxide was applied to a fabric of polyvinyl chloride, and both sides of the so treated fabric were covered with cellophane, followed by heating for 4 hours at 120° C. The resulting membraneous polymeric substance was sulphonated for 12 hours at 60° C. with a 98% sulphuric acid. An experiment on the concentrating of sea brine was carried out with the use of an apparatus provided with the so obtained cationic exchange membrane and the anionic exchange membrane of Example 8.

First, the sea brine was directly subjected to dialysis for 3 days, and then the sea brine, to which was added a low condensation product of Formalin and naphthalenesulphonic acid (Demor N), was subjected to dialysis for another three days. Subsequently, in the same apparatus, sea brine without the said additive was subjected to electrodialysis. The obtained results are shown in Table 4 below.

TABLE 4

| Period after start of experiment (days) | 2 | 5 | 7 | 15 | 30 |
|---|---|---|---|---|---|
| Sea brine to be treated | Sea brine per se | Sea brine plus additive | Sea brine per se | | |
| $P^{SO_4}_{Cl}$ | 0.11 | 0.05 | 0.05 | 0.06 | 0.08 |

EXAMPLE 17

The cationic exchange membrane of Example 1 was immersed for 2 hours in excess of a 200 p.p.m. aqueous solution of polyethylene imine with a molecular weight of 6,000, and the anionic exchange membrane of Example 8 was immersed for 5 hours in a 1% aqueous solution of a low condensation product of Formalin and naphthalenesulphonic acid. With the use of the so treated exchange membranes, an experiment on the concentrating of sea brine was carried out. As the result, the relative transport number was 0.4 for $$\left(P^{Mg}_{Na}\right)$$

0.5 for $$\left(P^{Ca}_{Na}\right)$$

and 0.06 for $$\left(P^{SO_4}_{Cl}\right)$$

A continued experiment for four successive days did not bring about any change in relative transport number.

EXAMPLE 18

With the use of the membrane of Example 1(A) and on addition of 4×10$^{-3}$ mole/l. of hexamine cobalt complex salt [CO(NH$_3$)6]Cl$_3$, electrodialysis was carried out in the same manner as in Exmaple 1(B). The obtained results are shown in Table 5 below.

TABLE 5

| | Control | Present invention |
|---|---|---|
| Transport number | 0.98 | 0.98 |
| Electric resistance | 7 | 9 |
| Relative transport number | 2.5 | 2.1 |

The deposition of 8 mg./dm.$^2$ of [CO(NH$_3$)$_6$]$^{+++}$ on the surface of the said membrane was observed.

What we claim:

1. An ion permeable membrane consisting essentially of an anion or cation exchange membrane consisting of an insoluble, infusible synthetic organic polymer having a dissociable ionic group chemically bonded thereto, at least one of the surfaces of said membrane having had applied thereto and absorbed thereon a water-soluble electrolyte containing an ion component having a molecular weight of at least 100 and being of the same charge as the ion that can permeate said membrane, the dissociation constant of said electrolyte being at least 0.001, said electrolyte being present in an amount of at least 0.1 milligram for each square decimeter of said ion exchange membrane.

2. An ion permeable membrane according to claim 1 which can effect the permeation selectively of the monovalent ion from among those having the same charge.

3. An ion permeable membrane according to claim 1 wherein said electrolytic substance is present in an amount of 0.5 milligram to 5 milligrams for each square decimeter of said ion exchange membrane.

4. An ion permeable membrane consisting essentially of a cation exchange membrane consisting of an insoluble, infusible synthetic organic polymer having a dissociable anionic group chemically bonded thereto, at least one of the surfaces of said membrane having had applied thereto and absorbed thereon a water-soluble electrolyte containing a cation component having a molecular weight of at least 100, the dissociation constant of said electrolyte being at least 0.001, said electrolyte being present in an amount of at least 0.1 milligram for each square decimeter of said ion exchange membrane.

5. An ion permeable membrane consisting essentially of an anion exchange membrane consisting of an insoluble, infusible synthetic organic polymer having a dissociable cationic group chemically bonded thereto, at least one of the surface of said membrane having had applied thereto and absorbed thereon a water-soluble electrolyte containing an anion component having a molecular weight of at least 100, the dissociation constant of said electrolyte being at least 0.001, said electrolyte being present in an amount of at least 0.1 milligram for each square decimeter of said ion exchange membrane.

6. The ion permeable membrane of claim 5 wherein said anion component is a member selected from the class consisting of sulfonic acid and sulfonate groups.

7. The ion permeable membrane of claim 4 wherein said cation component is a quaternary ammonium salt.

8. The ion permeable membrane of claim 4 wherein said cation component is a water-soluble amino compound.

9. The ion permeable membrane of claim 8 wherein said amino compound is polyethylene imine.

10. A method of treating an ion exchange membrane which comprises applying to the surface of a cation exchange membrane and absorbing thereon an insoluble, infusible synthetic organic polymer having a dissociable anionic group chemically bonded thereto, an aqueous solution of an electrolyte containing a cation component having a molecular weight of at least 100, the dissociation constant of said electrolyte being at least 0.001, thereby imparting to said cation exchange membrane the property by which it can effect the permeation selectively of the cation of smaller valence from among those having the same charge.

11. A method of treating an ion exchange membrane which comprises applying to the surface of an anion exchange membrane and absorbing thereon an insoluble, infusible synthetic organic polymer having a dissociable cationic group chemically bonded thereto, an aqueous solution of an electrolyte containing an anion component having a molecular weight of at least 100, the dissociation constant of said electrolyte being at least 0.001, thereby imparting to said anion exchange membrane the property by which it can effect the permeation selectively of the anion of smaller valence from among those having the same charge.

12. A method of treating an ion exchange membrane which comprises installing an ion exchange membrane consisting of an insoluble, infusible synthetic organic polymer having a dissociable ionic group chemically bonded thereto, in an electrolytic cell containing an electrically conductive aqueous medium, said membrane being disposed between the cathode and anode, said aqueous medium containing an electrolyte in at least a concentration of 0.1 p.p.m., said electrolyte containing an ion component having a molecular weight of at least 100 and of the same charge as that of the ion that can permeate said membrane, the dissociation constant of said electrolyte being at least 0.01, passing a direct current between said cathode and anode to effect the adhesion of said electrolyte to the surface of said ion exchange membrane in an amount of at least 0.1 milligram for each square decimeter of the surface, thereby imparting to said ion exchange membrane the property by which it can effect the permeation selectively of the ion of smaller valence from among those having the same charge.

References Cited

UNITED STATES PATENTS

| | | | |
|---|---|---|---|
| 3,227,662 | 1/1966 | Kollsman | 260—2.1 |
| 3,268,433 | 8/1966 | Abere | 204—181 |
| 3,276,989 | 10/1966 | Nishihara et al. | 204—296 |
| 3,276,991 | 10/1966 | Hani et al. | 204—296 |

JOHN H. MACK, Primary Examiner

A. C. PRESCOTT, Assistant Examiner

U.S. Cl. X.R.

204—180, 296, 301